United States Patent
Gonzalez et al.

(10) Patent No.: US 6,526,203 B1
(45) Date of Patent: Feb. 25, 2003

(54) ARRAYED WAVEGUIDE GRATING WITH REDUCED CROSSTALK

(75) Inventors: Daniel Ortega Gonzalez, Glasgow (GB); Harm Van Weerden, Enschede (NL)

(73) Assignee: Alcatel Optronics UK Limited, London (GB)

(*) Notice: Subject to any disclaimer, the term of this patent is extended or adjusted under 35 U.S.C. 154(b) by 36 days.

(21) Appl. No.: 09/870,535

(22) Filed: May 30, 2001

(51) Int. Cl.[7] .................................................. G02B 6/34
(52) U.S. Cl. ............................ 385/37; 385/24; 385/31; 385/43
(58) Field of Search ............................. 385/37, 31, 39, 385/43, 48, 50, 24, 28

(56) References Cited

U.S. PATENT DOCUMENTS 5,629,992 A * 5/1997 Amersfoort et al. .......... 385/15
6,069,990 A * 5/2000 Okawa et al. ................. 378/43

FOREIGN PATENT DOCUMENTS

| EP | 301 194 B1 | 9/1993 |
| JP | 11-133253 A | 5/1999 |
| JP | 00-171648 A | 6/2000 |
| WO | WO 98/58283 A2 | 12/1998 |

OTHER PUBLICATIONS

Okayama, H. and Kawahara, M. "Prototype 32×32 optical switch matrix" *Electronics Letters* 30(14):1128–1129 (Jul. 7, 1994).

* cited by examiner

*Primary Examiner*—Robert H. Kim
*Assistant Examiner*—Therese Barber
(74) *Attorney, Agent, or Firm*—Lahive & Cockfield, LLP

(57) ABSTRACT

Arrayed Waveguide Grating with Reduced Crosstalk An Arrayed Waveguide Grating (AWG) having reduced adjacent crosstalk is described. Interspersed ones (21) of the output waveguides of the AWG are of different widths to the remaining output waveguides (23), along corresponding portions of their lengths, preferably in at least an initial portion of the fan-out region. Passband unifonmity is maintained by making all the output waveguides substantially of the same width at the output slab coupler. In the illustrative embodiment, alternate ones of the plurality of output waveguides are tapered to a narrower width ($W_2$) between first and second portions (22,24) thereof and the remaining ones of the output waveguides are of a substantially uniform width ($W_1$) between corresponding first and second portions thereof.

24 Claims, 4 Drawing Sheets

Output spectrum using alternating taper scheme

Output spectrum without alternating taper scheme

ARRAYED WAVEGUIDE GRATING WITH REDUCED CROSSTALK

FIELD OF THE INVENTION

The present invention relates to dispersive optical devices. More specifically, but not exclusively, the invention relates to an improved arrayed waveguide grating (AWG) device.

BACKGROUND ART

In order to meet the ever-increasing demand for transmission bandwidth in communication networks, operators are investing heavily in the development of techniques for Dense Wavelength Division Multiplexing (DWDM). DWDM employs many closely spaced carrier wavelengths, multiplexed together onto a single waveguide such as an optical fibre. The carrier wavelengths are spaced apart by as little as 50GHz in a spacing arrangement designed for an ITU (International Telecommunications Union) channel "grid". Each carrier wavelength may be modulated to provide a respective data transmission channel. By using many channels, the data rate of each channel can be kept down to a manageable level.

Clearly, to utilize this available bandwidth it is necessary to be able to separate, or demultiplex, each channel at a receiver. New optical components for doing this have been designed for this purpose, one of these being the Arrayed Waveguide Grating (AWG). An AWG is a planar structure comprising a number of array waveguides which together act like a diffraction grating in a spectrometer. AWGs can be used as multiplexers or demultiplexers, and a single AWG design can commonly be used both as a multiplexer and demultiplexer. A typical AWG mux/demux 1 is illustrated in FIGS. 1 and 2 and comprises a substrate or "die" 1 having provided thereon at least one single-mode input waveguide 2 for a multiplexed input signal, two slab couplers 3,4 (also sometimes referred to as "star couplers") connected to either end of an arrayed waveguide grating 5 consisting of an array of transmission waveguides 8, only some of which are shown, and a plurality of single mode output waveguides 10 (only some shown) for outputting respective wavelength channel outputs from the second (output) slab coupler 4 to the edge 12 of the die 1. In generally known manner, there is a constant predetermined optical path length difference between the lengths of adjacent waveguides 8 in the array which determines the position of the wavelength output channels on the output face of the second slab coupler 4. The construction and operation of such AWGs is well known in the art. See for example, "PHASAR-based WDM-Devices: Principles, Design and Applications", M K Smit, IEEE Journal of Selected Topics in Quantum Electronics Vol.2, No.2, June 1996. In some cases, there are no input waveguides: instead, the first slab coupler 3 is arranged at the edge of the die 1, so that an input signal can be launched directly into the slab.

One problem with AWGs is that signal coupling between the output waveguides often occurs. This tends to increase crosstalk between adjacent channels of the AWG which is detrimental to performance.

Japanese unexamined patent application, JP2000171648, describes one approach for minimizing adjacent crosstalk in an AWG. This involves decreasing the spot size of the single mode input and output waveguides where they are connected to the slab couplers. This can be done by reducing the width of all the waveguides or by changing the refractive index of all the waveguides. Spot size is however only easily definable for single mode waveguides. Moreover, decreasing the width of the waveguides at the coupler tends to decrease the usable bandwidth of the signal outputs from the respective wavelength channels. Another embodiment is also shown in which the spot size is so reduced only in alternate ones of the input/output waveguides. A significant disadvantage of this latter solution, where the reduced spot size is achieved by reducing the width of the waveguides, is that alternate waveguides are thus of different widths at the slab coupler. The waveguide width at the first and second slab couplers affects the passband and bandwidth of the output wavelength channels and so this solution has the disadvantage that the output wavelength channels are not of uniform passband (i.e. power output response) across all the output channels.

It is an aim of the present invention to avoid or minimize one or more of the foregoing disadvantages.

SUMMARY OF THE INVENTION

According to a first aspect of the invention there is provided an arrayed waveguide grating (AWG) device comprising: first and second slab couplers; a plurality of array waveguides optically coupled between the first and second slab couplers and having predetermined optical path length differences therebetween; and a plurality of output waveguides optically coupled at first ends thereof to an output side of the second slab coupler, for outputting different wavelength channel outputs therefrom; wherein the output waveguides are multi-mode waveguides; at least one of the output waveguides, along at least a portion of its length, is of different width to at least one adjacent one of the output waveguides along an adjacent portion of the length thereof; and all the output waveguides are of substantially equal width at said first ends thereof where they are coupled to the second slab coupler.

The AWG according to the invention has the advantage of reduced coupling between the output waveguides due to at least some adjacent ones of the output waveguides being of different widths along adjacent portions of their lengths, while the passband of each output wavelength channel is substantially the same by virtue of the output waveguides all being of substantially the same width where they are optically coupled to the second slab coupler.

In the preferred embodiment, said at least one of the output waveguides is tapered in width along an initial portion thereof, from said first end thereof.

Each output waveguide is preferably a double mode waveguide. The widths of the output waveguides may alternate through a series of N different widths (e.g. 3 different widths), between corresponding first and second portions of the lengths of the output waveguides, whereby every Nth one (e.g every third one ) of the output waveguides is of the same width along a corresponding portion of its length. In the preferred embodiment, adjacent ones of the output waveguides are of different widths along at least a portion of their lengths, preferably along at least an initial portion proximal to the second slab coupler. Some of the output waveguides, for example alternate ones, may be of substantially uniform width along their entire lengths, between first and second ends thereof, with no tapering. In a further possibility, each output waveguide is tapered at first end portions thereof and second portions along the length thereof.

According to a second aspect of the invention we provide a power monitor comprising: an arrayed waveguide grating (AWG) as above-described; and detector means for detecting the different wavelength channel outputs at output ends of the output waveguides.

According to a further aspect of the invention there is provided an arrayed waveguide grating (AWG) device comprising: first and second slab couplers; a plurality of array waveguides optically coupled between the first and second slab couplers and having predetermined optical path length differences therebetween; and a plurality of output waveguides optically coupled at first ends thereof to an output side of the second slab coupler, for outputting different wavelength channel outputs therefrom; wherein the output waveguides are multi-mode waveguides; at least one of the output waveguides, along at least a portion of its length, is of different width to at least one adjacent one of the output waveguides along an adjacent portion of the length thereof; said at least one of the output waveguides is tapered in width along an initial portion thereof, from said first end thereof; and the widths of the output waveguides at said first ends thereof where they are optically coupled to the second slab coupler are designed so as to achieve a substantially uniform passband over all the output wavelength channels of the device.

BRIEF DESCRIPTION OF THE DRAWINGS

Preferred embodiments of the invention will now be described by way of example only and with reference to the accompanying drawings in which.

DETAILED DESCRIPTION OF THE PREFERRED EMBODIMENTS

Figure 1:
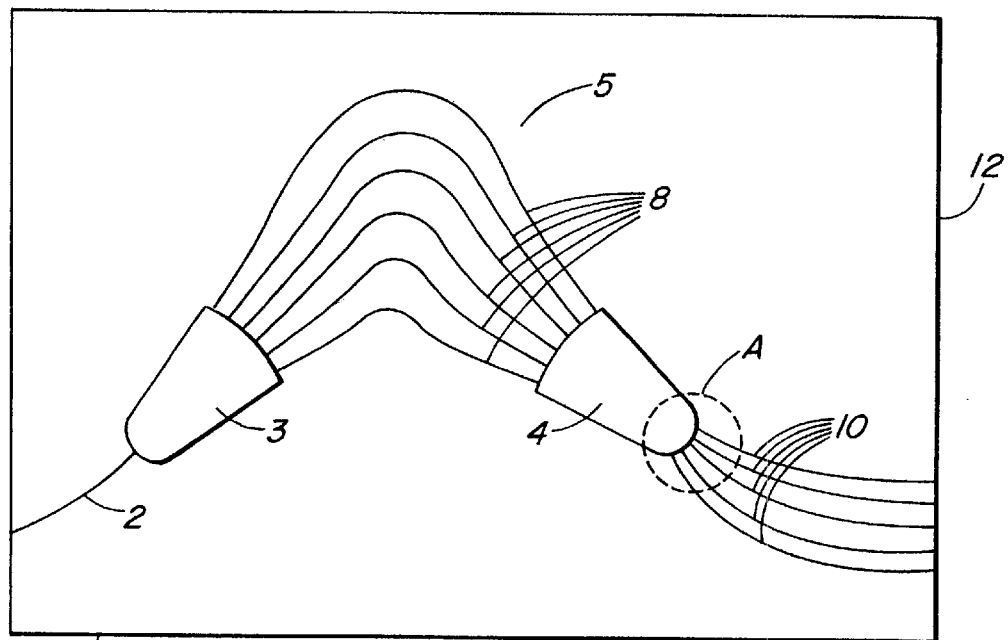
FIG. 1 is a schematic plan view of a known AWG device.
Figure 2:
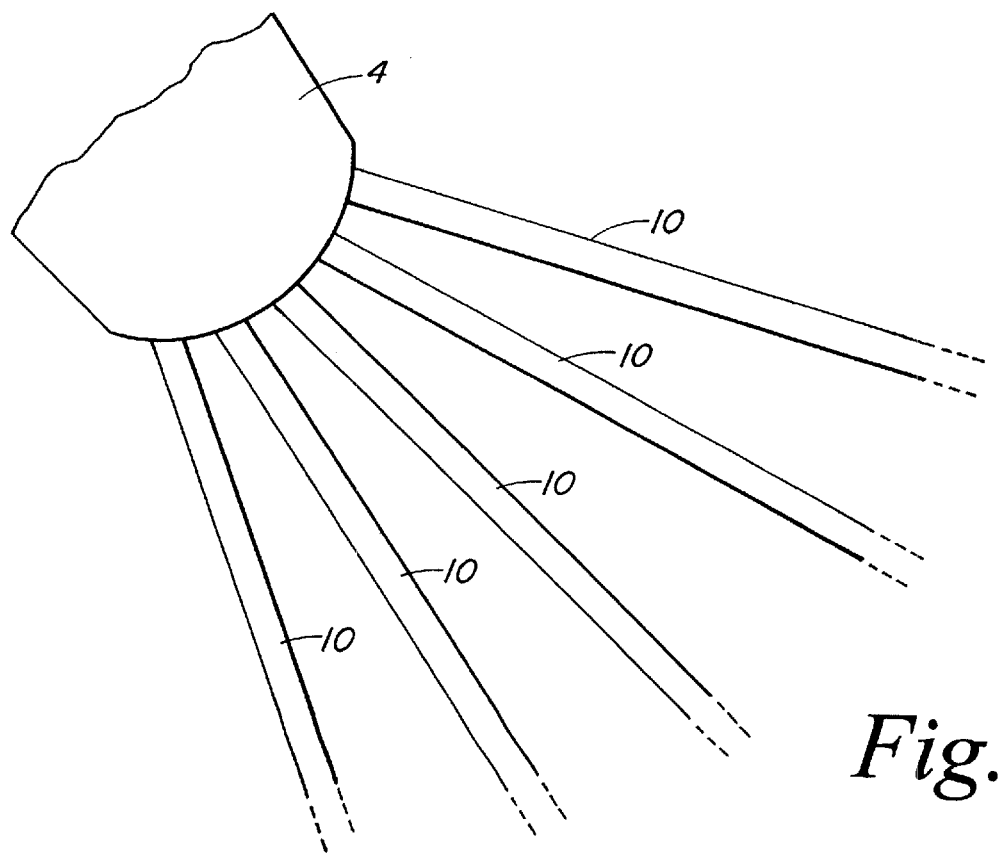
FIG. 2 is a magnified view of the ringed portion A of the device of FIG. 1, showing a conventional configuration of output waveguides in a fan-out region.
Figure 3:
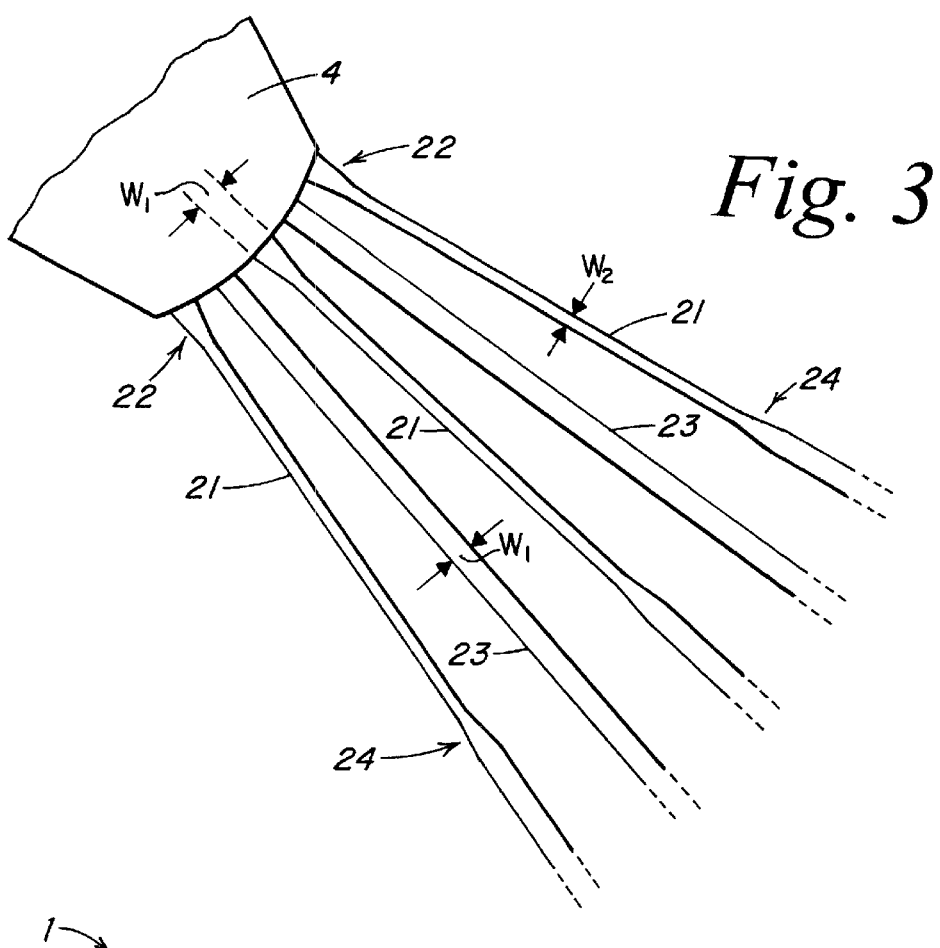
FIG. 3 is a magnified view of the ringed portion A of a modified version of the device of FIG. 1, showing an improved configuration of output waveguides in the fan-out region.

FIG. 3 illustrates an improvement to the AWG of FIGS. 1 and 2. Like reference numerals to those used in FIG. 1 will be used to refer to like parts. The features of the improved AWG are identical to those of the AWG of FIG. 1, except for the output waveguides. The output waveguides of the improved AWG are double-mode waveguides. This has the advantageous effect of flattening the passband (i.e. the power output response) of each wavelength channel, which results in a wider bandwidth. The output waveguides are also configured such that alternate ones 21 are substantially adiabatically tapered at first ends portions 22 thereof, where the waveguides are coupled to the second slab coupler 4. As shown in FIG. 2(b), these first end portions widen in width from a first width $W_2$ towards the second slab coupler 4. Opposing portions 24 of these alternate output waveguides 21, located in a fan-out region of the AWG (in which fan-out region the output waveguides are diverging away from one another) are also similarly adiabatically tapered, but in the opposite sense, so as to widen away from the slab coupler 4, to the same width $W_1$ as the widest end of the first tapered ends 22. The width of the rest of the length of these alternate waveguides 21, from these second tapered portions 24 to the edge 12 of the die 1, is of the same, or substantially the same, width W) as the widest ends of the tapers. The remaining ones 23 of the output waveguides are of uniform, or substantially uniform, width along their entire lengths, this uniform width in this embodiment being equal to the width $W_1$ of the widest width portions of the alternate tapered waveguides 21. Thus, the width of the alternate tapered waveguides 21, between the tapered portions thereof, is smaller than the width of the remaining waveguides. The presence of the different width portions of adjacent output waveguides reduces coupling between adjacent output waveguides which consequently results in reduced adjacent crosstalk.

In the embodiment of FIG. 3 the widths of the first ends of all of the output waveguides (tapered 21 and non-tapered 23), where the output waveguides are coupled to the second slab coupler 4, are identical (or as near identical as possible to fabricate in practice). This width affects the shape of the passband of the output wavelength channel, and consequently also affects the usable bandwidth of the channel. It is highly desirable for all the channels to be of uniform passband and to have equal usable bandwidth. Moreover, as double-mode waveguides are being used so as to achieve a wider bandwidth, it is important that two modes are in practice excited in each output waveguide. If some of the waveguides were of narrower width than the others, the desired two modes may not be excited (perhaps only one mode might be excited). To this end the width of each double mode output waveguide is therefore designed to be the same at the second slab coupler. Also, certain losses may be a function of the output waveguide width and for this reason it is desirable to also make all the output waveguides of equal width at the output ends thereof, at the edge 12 of the die. It will be appreciated that adiabatic tapers are used to narrow/widen the waveguides to ensure that loss of signal energy through mode conversion is substantially avoided.

The length of the portions of the waveguides which are of unequal width in the FIG. 3 embodiment is chosen such that adjacent waveguides are of unequal width at least until the output waveguides are sufficiently decoupled that practically no, or only up to a predetermined maximum level of, adjacent crosstalk (hereinafter referred to as AXT) is present in the AWG e.g. no more than −35 dB AXT. In the FIG. 3 embodiment adjacent waveguides are of unequal width along an initial portion of the fan-out region, this initial portion comprising approximately 5 to 30%, typically 11%, of the length of the fan-out region, as measured along the bottom edge 11 of the die. However, in other possible embodiments the tapered waveguides may be of unequal width along a larger portion, or even substantially the full length, of the output waveguides.

Figure 4:
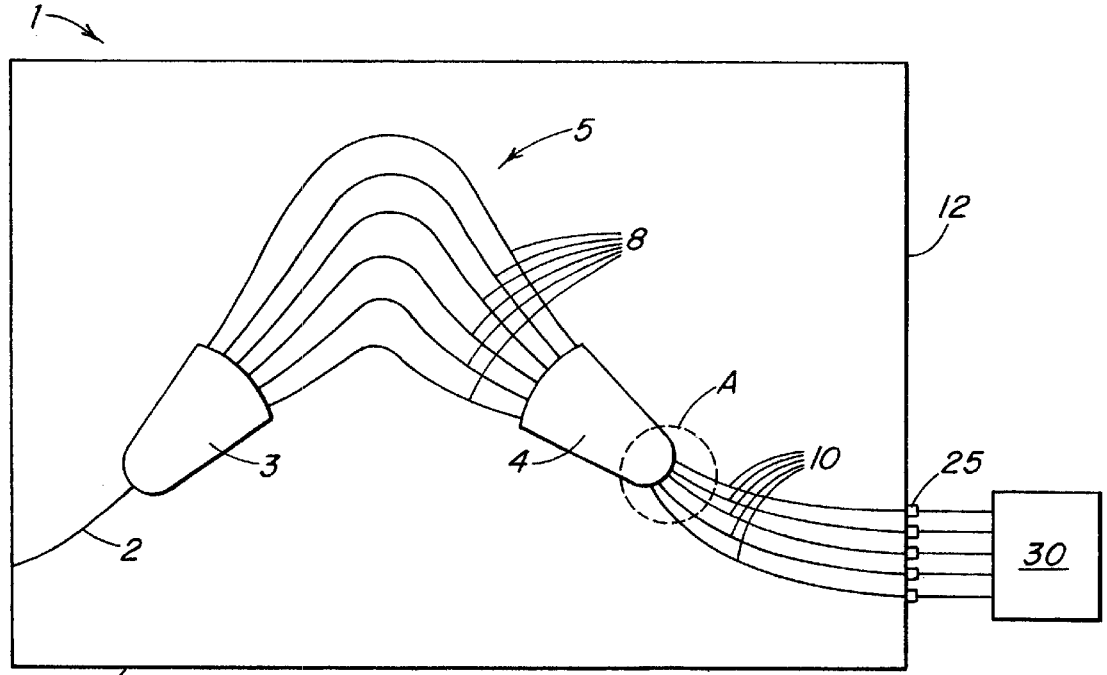
FIG. 4 is a schematic plan view of a power monitor incorporating the AWG of FIG. 3.

The above described AWG device can be incorporated in a power monitor. FIG. 4 shows a power monitor incorporating an AWG according to the invention. Again, like reference numerals are used to refer to like parts as in the previous drawings. The power monitor consists of an AWG device and a plurality of detectors 25 arranged adjacent the output edge 12 of the die, there being one detector provided for each output waveguide 10 of the AWG. The detectors 25 are connected to power/control electronic circuitry 30. The AWG incorporated in the power monitor is identical to that of FIG. 1 as modified according to FIG. 3.

Figure 5A:
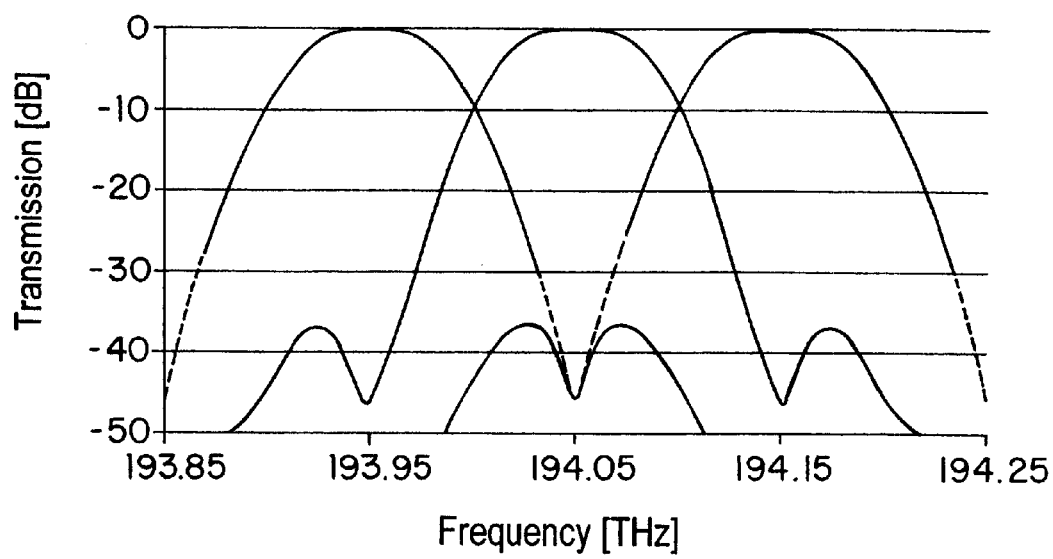
FIG. 5(a) is a graph of the output spectrum of the power monitor of FIG. 3, for three wavelength channel outputs.
Figure 5B:
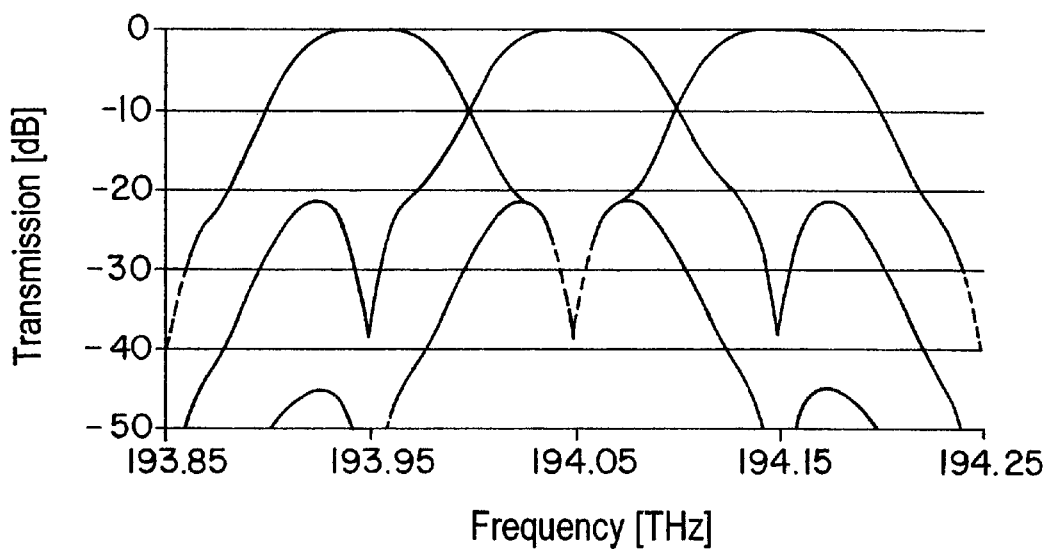
FIG. 5(b) is a graph of the output spectrum of a similar power monitor, which does not use alternating tapers on the output waveguides.

FIG. 5(a) illustrates a simulated transmission spectrum of the power monitor of FIG. 4, for three adjacent wavelength output channels. FIG. 5(b) illustrates the corresponding simulated transmission spectrum which would be achieved if the alternate tapers configuration of FIG. 3 was not used i.e. if all the output waveguides 10 were of equal width all along their lengths, as shown in FIG. 2. The simulations were carried out using BPM calculations in conventional manner. It can clearly be seen that the sidelobes of the output response in FIG. 5(a) are much smaller than those in FIG. 5(b), indicating an adjacent crosstalk improvement from −22 dB to −35 dB. Although there are still side lobes in FIG. 5(a) these are sufficiently suppressed to meet predetermined adjacent crosstalk specifications.

In a modified version of the AWG of FIG. 3, or the power monitor of FIG. 4, both the alternate waveguides 21 and the remaining waveguides 23 are tapered at the first (input) ends 22 thereof, but they taper down from a common first width $W_1$ to respective different widths $W_2, W_3$. Only the alternate ones (or only the remaining ones) are inversely tapered at opposing portions 24 thereof so as to widen up to the same width as the other waveguides which are only tapered at one end. For example, each output waveguide 10 may be of width 14 μm at its first end, where it is coupled to the second slab 4. From this end, the even output waveguides 23 (counting from the top and down, in FIG. 3) may taper down to a width of 11 μm while the odd output waveguides 21 taper down to a narrower width of 8.5 μm. At opposing tapered portions 24 the odd waveguides taper outwardly again to a width of 11 μm, but the even waveguides remain of width 11 μm.

In other possible embodiments, both ends of each output waveguide may be tapered (i.e. at the connection to the second slab coupler 4 and at the edge 12 of the die 1), while between the tapered ends alternate waveguides are of narrower width than the remaining waveguides. All the output waveguides would be of substantially equal width at their input ends and their output ends (although the input ends could be of different width to the output ends).

In another possible embodiment all the output waveguides may have an equal width, straight section adjacent the second slab coupler 4, and alternate ones of the output waveguides are tapered at a portion disposed a distance way from the second slab, so as to taper down or up to a different width from its neighboring waveguides. The different width waveguide portions are preferably still in the fan-out region of the device.

In another possible embodiment, instead of the tapered waveguide ends in FIG. 3 in which the width of the waveguide narrows in width as the waveguide extends away from the slab coupler, the taper may be in the inverse direction so that the waveguide widens away from the slab, along an initial portion of the waveguide. Thus the waveguides having the tapered ends in this case would have sections of wider width than the remaining waveguides.

In possible embodiments where more than one input waveguide 2 is provided, the same principle for minimizing adjacent crosstalk can also be employed i.e. corresponding portions of alternate ones (or more irregularly interspersed ones) of the input waveguides can be configured to have different widths, so as to minimize coupling therebetween. In the preferred embodiment, the input waveguides will fan-in towards the first slab coupler 3, and the different width waveguide sections will be in at least a portion of the fan-in region adjacent the first slab coupler. Again, all the input waveguides will be of substantially identical width where they are coupled to the first slab coupler, in order to maintain uniform passbands and equal bandwidths across the output wavelength channels.

Figure 6:
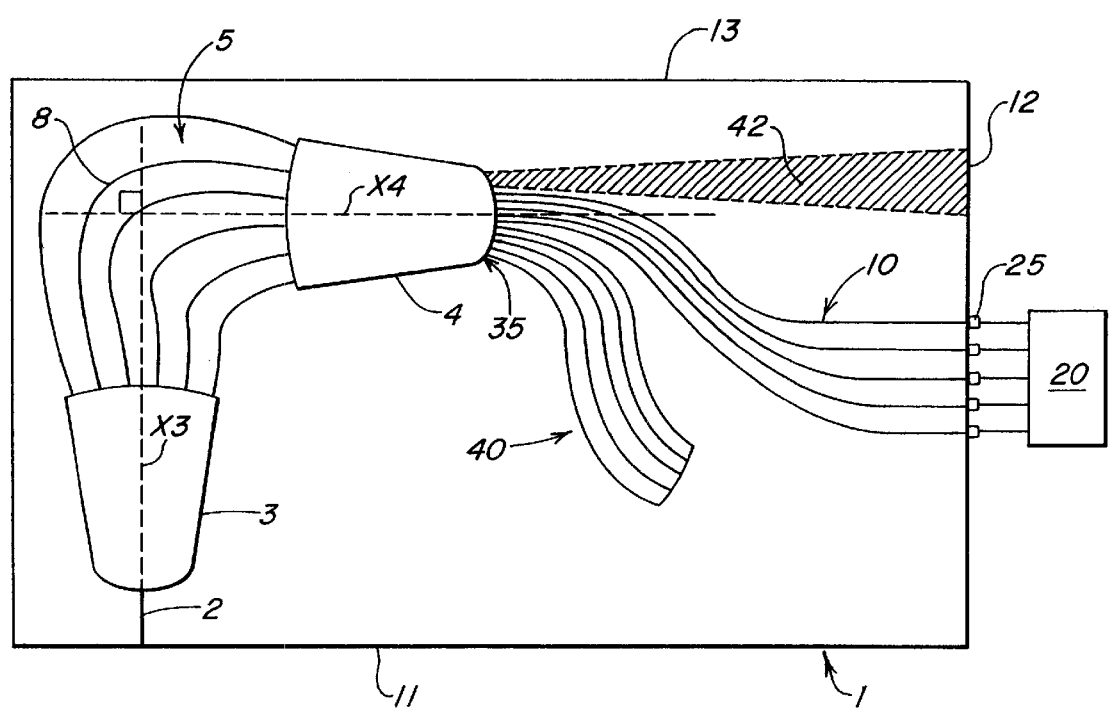
FIG. 6 is a schematic plan view of a power monitor according to another embodiment of the invention.

FIG. 6 illustrates a power monitor according to a further embodiment of the invention, in which like components to those of FIG. 4 are referenced by like reference numerals. In this embodiment, the plan view layout of the first and second slabs, the array waveguides, and the output waveguides, is chosen specifically so as to avoid, or at least minimize, the possibility of any stray (unwanted) light from the input slab, array waveguides, or output slab, from being received by the detectors 25. This is at least partly achieved by arranging the first slab 3 with its longitudinal axis X3 arranged generally perpendicular to an input edge 11 of the die 1, and arranging the second slab 4 so that its longitudinal axis X4 is substantially perpendicular to the longitudinal axis X3 of the first slab 3. Thus, any stray light output from the first slab 3 and which does not enter the transmission waveguides 8 cannot propagate towards the second slab, and thus to the detectors 25. In this design, an input waveguide 2 carries an input multiplexed signal from the input edge 11 of the die to the first slab coupler 3, and the output waveguides 10 output the different wavelength channel signals to the output edge 12 of the die which is perpendicular to the input edge 11, as shown in FIG. 6. Alternate ones of the output waveguides 10 have different widths in a portion of the fan-out region (proximal to the second slab coupler 4), as in the embodiment of FIGS. 3 and 4.

The bending of the output waveguides 10 (only some shown) is also designed so that any unwanted higher order images which appear at the output face 35 of the second slab 4 (i.e. the first, second, . . . etc. order images of the demultiplexed input signal) above the zeroth order output signals (which are collected by the output waveguides 10), in the FIG. 6 plan view, are not received by the detectors 25 at the edge 12 of the die. The area 42 into which the first order signals diverge from the output slab 4 are illustrated schematically by broken lines in FIG. 6. For the opposing higher order outputs which appear below the zeroth order signals, at the output face 35 of the second slab (in plan view), additional waveguides 40 (only some shown) are provided which carry these higher order outputs away from the second slab. These additional waveguides terminate well before reaching the output edge 12 of the die, so that any signals carried therein again are not received by the detectors 25. It will be appreciated that the novel layout of FIG. 6 can be applied to any AWG-based power monitor or demultiplexer, not just those incorporating output waveguides with different width sections as described above with reference to FIG. 4.

Further modifications and variations to the above described embodiments are possible without departing from the scope of the invention. For example, in some cases there may be no input waveguide(s) 2. Instead, the input (multiplexed) optical signal may be input directly to the first slab coupler 3.

Furthermore, in the above-described embodiments the width of all of the tapered first ends 22 is made identical, for the reasons already mentioned above. However, in other possible embodiments, for example where seeking to further improve uniformity in the passband or bandwidth over all the output wavelength channels, it may be desirable for some of the tapered first ends to be designed to have slightly different widths (at the slab 4), as described in our earlier UK patent application No. 0106014.4, for example the width of the output waveguides where they connect to the second slab may increase slightly from the first (i.e. lowest, in FIG. 1) output waveguide to the last (i.e. highest, in FIG. 1) output waveguide, for example from 13.6 $\mu$m to 14.4 $\mu$m for a 40 channel AWG. We refer to this as "chirping" the widths of the output waveguides. In this case, the tapered waveguide ends 22 will still be tapered, but will be of slightly different widths at the widest end of the taper (i.e. at the slab 4).

What is claimed is:

1. An arrayed waveguide grating (AWG) device comprising:
   first and second slab couplers;
   a plurality of array waveguides optically coupled between the first and second slab couplers and having predetermined optical path length differences therebetween; and
   a plurality of output waveguides optically coupled at first ends thereof to an output side of the second slab coupler, for outputting different wavelength channel outputs therefrom; wherein
   the output waveguides are multi-mode waveguides;
   at least one of the output waveguides, along at least a portion of its length, is of different width to at least one adjacent one of the output waveguides along an adjacent portion of the length thereof; and
   all the output waveguides are of substantially equal width at said first ends thereof where they are optically coupled to the second slab coupler.

2. An AWG according to claim 1, wherein said at least one output waveguide is tapered in width along an initial portion thereof, from said first end thereof.

3. An AWG device according to claim 2, wherein the or each said tapered waveguide is adiabatically tapered.

4. An AWG device according to claim 2, wherein the or each said tapered output waveguide narrows in width from its first end, along an initial portion of its length.

5. An AWG according to claim 1, wherein a plurality of the output waveguides, interspersed with the remaining ones of the output waveguides, are of different width to said remaining ones of the output waveguides, along at least a portion of their lengths.

6. An AWG according to claim 5, wherein every Nth one of the output waveguides is of equal width along said different width portion of its length, where N is an integer greater than 1.

7. An AWG according to claim 5, wherein adjacent ones of the output waveguides are of different widths along corresponding portions of their lengths.

8. An AWG according to claim 7, wherein the output waveguides fan-out from the second slab coupler, in a fan-out region of the device, and adjacent ones of the output waveguides are of different widths along a portion of the fan-out region proximal to the second slab coupler.

9. An AWG according to claim 1, wherein each output waveguide is a double-mode waveguide.

10. An AWG according to claim 4, wherein the or each said tapered output waveguide is also tapered in width so as to widen along second portions thereof towards second ends of the output waveguides.

11. An AWG according to claim 10, wherein all the output waveguides are of substantially equal width at the second ends thereof.

12. An AWG according to claim 1, wherein some of the output waveguides are of substantially uniform width along their entire lengths.

13. An AWG according to claim 1, wherein some of the output waveguides are tapered in width at first ends thereof while being of substantially uniform width along their remaining length.

14. An AWG according to claim 1, wherein the width of the output waveguides at their first ends is substantially equal to the width of the output waveguides at output ends thereof.

15. An AWG according to claim 1, further including a plurality of input waveguides optically coupled at first ends thereof to an input side of the first slab coupler, wherein at least one of the input waveguides is of different width, along at least a portion of the length thereof, to at least one adjacent one of the input waveguides along an adjacent portion thereof, and wherein all the input waveguides are of substantially equal width at said first ends thereof where they are coupled to the first slab coupler.

16. An AWG according to claim 15, wherein said at least one input waveguide having said different width is tapered from said first end thereof along at least an initial portion thereof.

17. An array waveguide grating (AWG) device according to claim 1, wherein the first and second slab couplers are arranged so that a longitudinal axis of the second slab coupler is substantially perpendicular to a longitudinal axis of the first slab coupler, said output waveguides are arranged to receive zero order output signals imaged at an output face of the second slab coupler, and the AWG device further includes additional waveguides optically coupled to the second slab coupler for conveying higher order signals comprising at least some first order output signals, away from the second slab coupler.

18. An AWG according to claim 17, wherein the output waveguides are arranged so as to bend away from an area into which non-zero order output signals imaged by the second slab coupler, comprising at least some first order output signals, diverge from the second slab coupler.

19. A power monitor comprising:
   an arrayed waveguide grating (AWG) according to claim 1, and
   detector means for detecting the different wavelength channel outputs at output ends of the output waveguides.

20. A power monitor according to claim 19, wherein at least one detector is provided for each wavelength channel output.

21. A communications system incorporating at least one AWG device according to claim 1.

22. A communications system incorporating at least one power monitor according to claim 19.

23. An AWG according to claim 1, wherein all the output waveguides are of equal width at said first ends thereof where they are coupled to the second slab coupler.

24. An arrayed waveguide grating (AWG) device comprising:
   first and second slab couplers;
   a plurality of array waveguides optically coupled between the first and second slab couplers and having predetermined optical path length differences therebetween; and
   a plurality of output waveguides optically coupled at first ends thereof to an output side of the second slab coupler, for outputting different wavelength channel outputs therefrom; wherein
   the output waveguides are multi-mode waveguides;
   at least one of the output waveguides, along at least a portion of its length, is of different width to at least one adjacent one of the output waveguides along an adjacent portion of the length thereof;
   said at least one of the output waveguides is tapered in width along an initial portion thereof, from said first end thereof, and
   the widths of the output waveguides where they are optically coupled to the second slab coupler are designed so as to achieve a substantially uniform passband over all the output wavelength channels of the device.

* * * * *